United States Patent [19]

Lamb

[11] 3,918,484

[45] Nov. 11, 1975

[54] FLUID SAMPLING DEVICE

[75] Inventor: Thomas H. Lamb, Allentown, Pa.

[73] Assignee: Bethlehem Steel Corporation, Bethlehem, Pa.

[22] Filed: Jan. 29, 1974

[21] Appl. No.: 437,554

[52] U.S. Cl. .............................. 137/553; 251/347
[51] Int. Cl.² .................. F16K 37/00; F16K 31/50
[58] Field of Search ............... 251/339, 340, 347; 137/553

[56] References Cited
UNITED STATES PATENTS

| | | | |
|---|---|---|---|
| 2,125,554 | 8/1938 | Franck | 251/340 |
| 2,865,596 | 12/1958 | Monnig | 251/340 X |
| 3,321,178 | 5/1967 | Pinke et al. | 251/347 X |
| 3,528,641 | 9/1970 | Harris et al. | 251/340 |
| 3,756,281 | 9/1973 | Gravert | 251/339 X |

FOREIGN PATENTS OR APPLICATIONS

| | | | |
|---|---|---|---|
| 1,293,911 | 4/1962 | France | 251/DIG. 4 |

*Primary Examiner*—Henry T. Klinksiek
*Attorney, Agent, or Firm*—Joseph J. O'Keefe; Michael J. Delaney; John J. Selko

[57] ABSTRACT

A sample bottle for obtaining fluid samples to be chemically analyzed is provided with a sampling valve at each end to open and close the bottle. The sampling valve is connected to the bottle by an adapter which together with a bushing forms a continuous passageway. A hollow sampling stem for conveying fluid moves within the passageway between an open and closed position, and an indicator is provided to indicate when the valve is open or closed.

13 Claims, 5 Drawing Figures

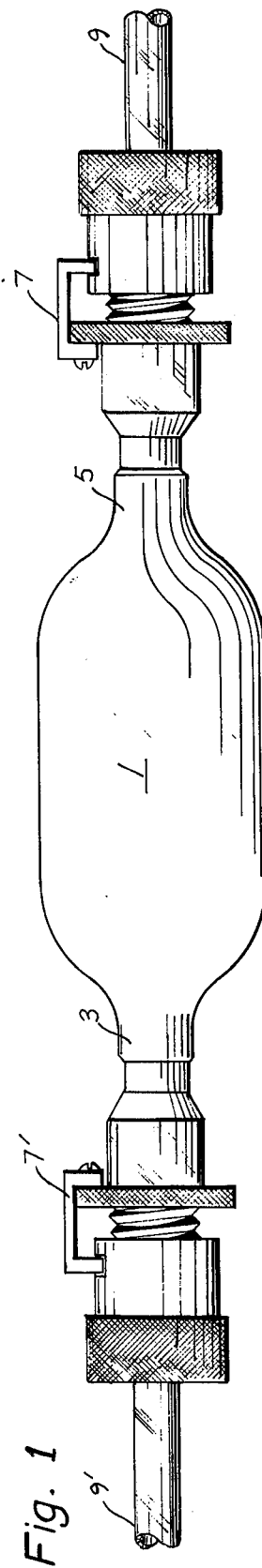
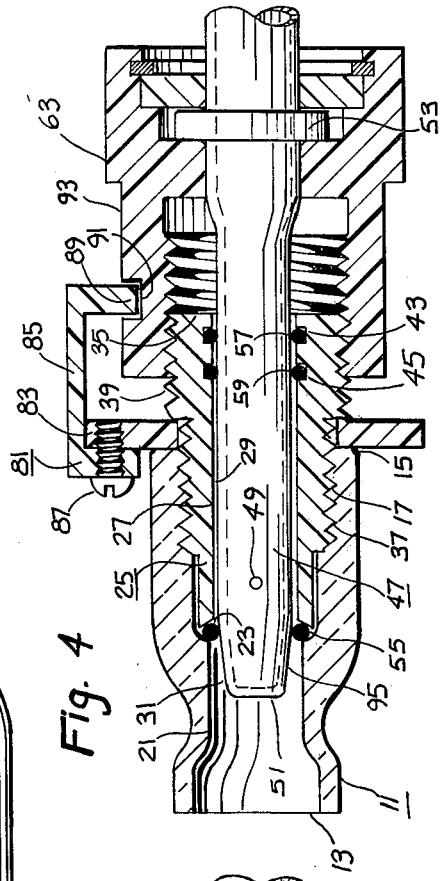
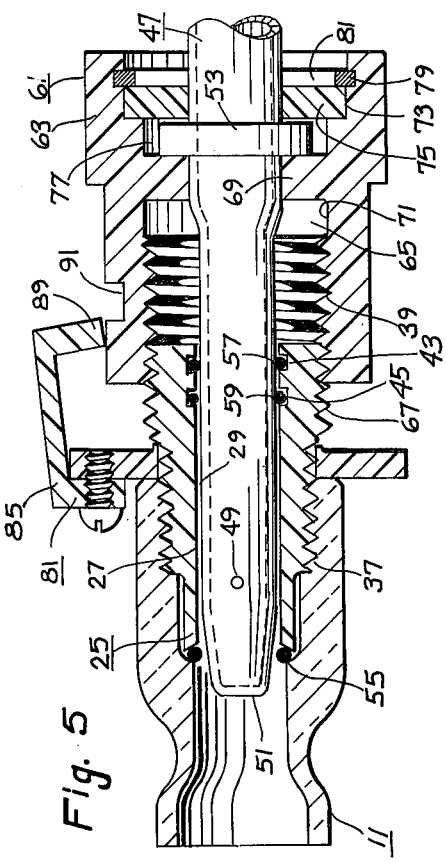
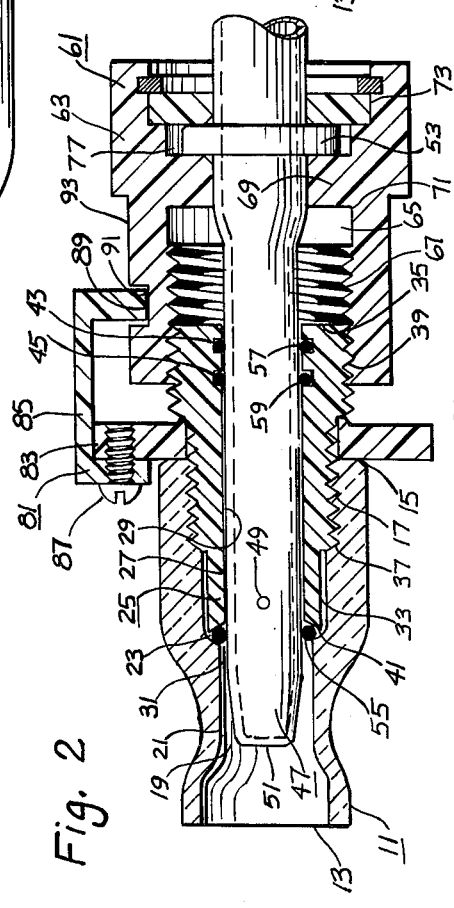
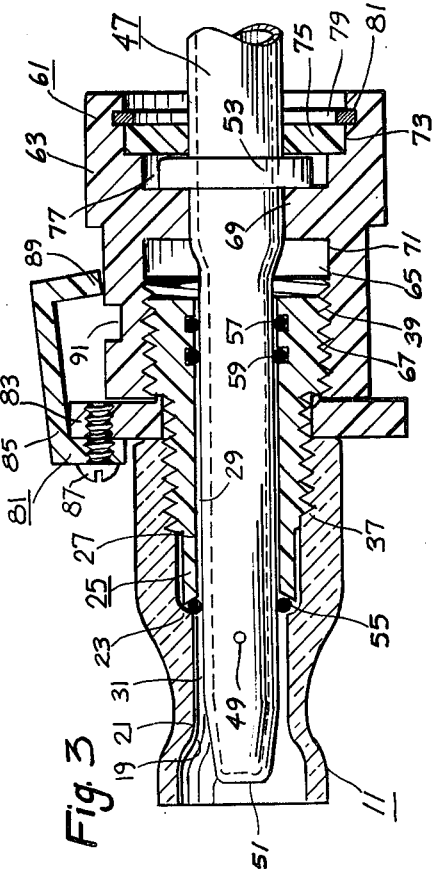

FLUID SAMPLING DEVICE

BACKGROUND OF THE INVENTION

This invention relates to fluid samplers, and more particularly to a device for opening and closing a fluid sample bottle used to obtain and transport fluid samples.

Because of recent pollution control laws, many samples of fluid, such as gas or air, are taken near smokestacks of industrial plants and conveyed to laboratories to be analyzed for $SO_2$, $NO_2$ and other components.

In the past, there have been problems in obtaining reliable samples for analysis, as for instance by spectrographic analysis, because prior art sample bottles use sampling valves that are subject to breakage and can introduce errors into the sample through inefficient operation, especially when the valves are required to maintain a vacuum of $10^{-7}$ atmospheres or greater.

Such prior art valves are made from glass with designs which are not suitable for rugged out of doors use, making breakage more likely. Many prior art sampling valves require a lubricant to enable them to make a proper seal. Such lubricants can introduce errors by adsorbing a portion of the fluid sample, and when the sample is tested on a mass spectrograph such lubricant can vaporize into the fluid sample and cause background interference.

Also, when fluid samples are obtained out of doors in cold weather, the lubricant in the valve can freeze, causing the valve to be difficult to open and close, and thus lead to breakage and sample loss when the operator attempts to work the valve.

SUMMARY OF THE INVENTION

It is an object of this invention to provide a fluid sampling valve, suitable for use out of doors, which valve minimizes breakage and sample loss.

It is also an object of this invention to provide a fluid sampling valve which does not adsorb a portion of the sample.

It is a further object of this invention to provide a fluid sampling valve which does not bind or freeze during use.

These and other objects can be achieved by providing a sampling valve having an adapter and a bushing forming a continuous passageway. For conveying fluid, a closed-end hollow sampling stem, siwh a fluid port adjacent the closed end, is concentrically supported within the continuous passageway. A seal contacting the adapter, bushing, and sampling stem is used for opening and closing the valve. Drive means are provided for positioning the fluid port of the sampling stem on opposite sides of the seal, when the valve is in the open and closed position.

An alternate embodiment is provided wherein the steam is in contact with the seal when the valve is closed, and out of contact with the seal when the valve is opened.

BRIEF DESCRIPTION OF THE DRAWINGS

FIG. 1 shows a sample bottle having the valve of this invention attached to both ends.

FIG. 2 is a section through the valve in the closed position.

FIG. 3 is a section through the valve in the open position.

FIG. 4 is an alternative embodiment of this invention showing a section through the valve in the closed position.

FIG. 5 is an alternative embodiment of this invention showing a section through the valve in the open position.

DETAILED DESCRIPTION OF THE PREFERRED EMBODIMENT

FIG. 1 shows a glass fluid sample bottle 1 of conventional design for obtaining and transporting a fluid sample to be analyzed. The bottle is supported at the site of sampling by any suitable means, such as a clamp (not shown). Connected to ends 3 and 5 of bottle 1 are fluid sampling valves of this invention, shown generally as 7 and 7'. The sampling valves 7 and 7' are identical, and a description of one valve will suffice for both.

Stem 9 can be connected by convention means, as for instance a rubber hose (not shown), to a source of fluid to be sampled, and stem 9' can be fitted with a conventional connector (not shown) suitable for quick connection to a mass spectrograph.

Referring to FIG. 2, a glass adapter 11 is shown having one end 13 suitable for connection by well known means, as for instance welding, to a sampling means, in this case, to end 5 of sample bottle 1. The other end 15 of adapter 11 is formed with internal threads 17.

Adapter 11 has a bore 19 extending through it. The internal surface 21 which forms bore 19 forms annular shoulder 23 intermediate ends 13 and 15.

A nylon 6/6 plastic material bushing 25 having a bore 27 therethrough formed by surface 29 is connected to adapter 11. The bore 19 of adapter 11 and bore 27 of bushing 25 form a concentric continuous passageway 31 for fluid. By concentric, it is understood to mean alignment on approximately the same axis.

The term plastic material refers to a chemically stable and inert material having suitable flexibility and impact strength, such as polytetrafluorethylene (TEFLON) or nylon 6/6 which is a resin formed by a condensation reaction between hexamethylene diamine and adipic acid.

Adjacent the opposite ends 33 and 35 of bushing 25 are external threads 37 and 39 respectively. End 33 forms an annular grooved surface 41 for retaining an O-ring as hereinafter described. External threads 37 are threaded into internal threads 17.

Intermediate ends 33 and 35 of bushing 25 are annular grooves 43 and 45 in surface 29 which forms bore 27.

Slidably extending within the continuous passageway 31 is a closed end glass tubular sampling stem 47. The sampling stem 47 has a fluid inlet port 49 through one wall of stem 47 adjacent closed end 51. Stem 47 is formed with a flange 53 externally extending radially therefrom. Flange 53 can be annular or it can be merely a radial projection from a portion of stem 47.

A sealing means, preferably an O-ring 55 is positioned in contact with end 33 of bushing 25, at grooved surface 41, shoulder 23 of adapter 11 and stem 47 to seal the continuous passageway 31 between the adapter 11, bushing 25, and stem 47.

The O-ring 55 should be made from a material which is suitably impervious to fluids, such as gases, chemically inert, and has effectively low vaporization under a vacuum as low as $10^{-7}$ atmospheres. The material should exhibit suitably low friction against the glass surface of sampling stem 47 and not scratch the glass when stem 47 moves.

I prefer an elastomer O-ring made from material sold by E. I. DuPont DeNemours and Company, Incorporated under the trademark VITON-A, which material is a linear copolymer of vinylidene fluoride and hexafluoro propylene, containing approximately 65 percent fluorine.

Sampling stem 47 is contacted and supported concentrically within the continuous passageway 31 by an annular TEFLON plastic material ring 57 positioned in groove 43. The stem 47 is spaced from adapter 11 and bushing 25 and has approximately the same axis as bores 19 and 27.

A second seal means, preferably an O-ring, 59, of the same material as O-ring 55, is positioned in groove 45 to contact bushing 25 and stem 47 to seal the continuous passageway 31 between bushing 25 and stem 47.

Although it is preferred to provide the plastic ring support means 57 and O-ring second seal means 59 as individual members, it would be equivalent to provide both functions in a single member, as in a single O-ring support and seal means.

Because sampling stem 47 is concentrically supported within passageway 31, stem 47 is not cocked or misaligned with respect to seal 55 due to the weight of a rubber hose (not shown) connected to stem 9. Therefore, stem 47 does not bind against seal 55 but moves freely within continuous passageway 31 reducing the chance of breakage during opening and closing. Stem 47 is also free to rotate within continuous passageway 31 further reducing the possibility of binding and breakage.

As can be seen in FIG. 2, valve 7 is in the closed position, because fluid traveling through hollow stem 47 can not pass seal 55 to enter a sample bottle (not shown) but which would be connected to adapter 11 at end 13. Nor would fluid be able to pass seal 59.

In FIG. 3, valve 7 is in the open position because port 49 is on the opposite side of seal 55 as it was in FIG. 2. Fluid traveling through hollow stem 47 can exit via port 49 and pass through adapter 11 and into a sample bottle (not shown) but which would be connected to adapter 11 at end 13.

Drive means for moving stem 47 back and forth between an open and closed position is shown generally as 61 in FIGS. 2 and 3. A nylon 6/6 plastic material nut 63 having a bore 65 therethrough is connected to bushing 25 by internal threads 67 which engage external threads 39 of bushing 25. The nut 63 is concentrically aligned so that the axis of bore 65 is approximately the same as the axes of bores 19 and 27. Extending radially within bore 65 of nut 63 adjacent internal threads 67 is an annular flange 69, which can press against flange 53 of stem 47. The surface 71 which forms bore 65 also forms an annular seat portion 73 into which is fitted an annular plastic material ring 75 which cooperates with flange 69 to define a space 77 for flange 53 of stem 47. Retaining ring 79 fits into annular slot 81 in surface 71 to retain ring 75 in place, as is well known.

As nut 63 is turned to cause threads 67 to advance on threads 39 ring 75 presses against flange 53 to slide stem 47 forward until port 49 is moved from the closed position to the open position. Likewise, as nut 63 is turned to cause threads 67 to back off threads 39, flange 69 presses against flange 53 to slide stem 47 backward in continuous passageway 31 until port 49 is in the closed position. Enough threads 39 are provided on end 35 of bushing 25 to permit nut 63 to advance and retract far enough to move port 49 from one side of seal 55 to the other side. Referring to FIGS. 2 and 3, indicator means for indicating when valve 7 is in the open or closed position is shown generally as 81. A nylon 6/6/ plastic material external flange 83 is mounted on bushing 25 intermediate ends 33 and 35. I prefer to simply force flange 83 onto bushing 25 to provide an interference fit, although flange 83 could be threaded onto bushing 25 as well. Flange 83 is positioned on bushing 25 to permit end 33 to be threaded into adapter 11 so that surface 41 forces O-ring 55 against shoulder 23.

A flexible nylon 6/6 plastic material arm 85 is fastened to flange 83 by screw 87 and extends back toward nut 63. End 89 of arm 85 extends into a slot 91 cut in the outside surface 93 of nut 63. The length of arm 85 is selected so that end 89 extends into slot 91 when port 47 is in the closed position as shown in FIG. 1. When nut 63 is turned to advance it on bushing 25, end 89 slides out of slot 91 and flexible arm 85 rides up on top of nut 63 as shown in FIG. 2.

FIGS. 4 and 5 show an alternate embodiment of the invention in the open and closed positions. All elements are the same as previously described except sampling stem 47 has a closed end 51 having a tapered nose 95 which contacts seal 55 when the valve 7 is closed. In the open position, nut 63 is backed off threads 39 and nose 95 is removed from contact with seal 55. Fluid traveling throgh stem 47 can exit port 49 and enter the bottle (not shown) connected to adapter 11 because stem 47 is spaced from seal 55. Second seal 59 prevents fluid leakage between stem 47 and bushing 25. Thus it can be seen that port 47 in both the open and closed position remains on the same side of seal 55 while opening and closing of valve 7 is effected by nut 63 forcing nose 95 into and out of contact with seal 55.

In operation, the valve is manipulated as follows: Sample bottle 1 is evacuated by suitable means, and then valves 7 and 7' are closed. Stem 9 is connected in the field to a source of fluid to be sampled, and valve 7 is opened to obtain a sample and then closed. The bottle is returned to the laboratory where stem 9' is connected to a mass spectrograph and valve 7' is opened to permit the sample to be analyzed. An alternative method would be to connect the stem 9 to a source of fluid to be sampled with both valves 7 and 7' in the open position. Fluid is permitted to flow through the bottle 1 to purge it, whereupon first valve 7' and then 7 is closed trapping a sample for analysis.

In actual practice I have employed a valve in which seal 55 is a VITON-A O-ring with an 0.176 inch inside diameter, 0.316 inch outside diameter, by 0.070 inch thick and seal 59 is a VITON-A O-ring with an 0.239 inch inside diameter, 0.379 inch outside diameter, and 0.070 inch thick. Support ring 57 is made from TEFLON with a 0.239 inch inside diameter, 0.379 inch outside diameter by 0.070 inch thick. Bushing 25, external flange 83, arm 85, nut 63 and retaining ring 75 are nylon 6/6 while adapter 11 is a borosilicate glass. Sampling stem 47 is a borosilicate glass (Pyrex) special wall tubing with a wall thickness of 3/64 inch and an outside diameter of 0.250 inches. Port 47 is one millimeter in diameter.

I claim:

1. A fluid sampling valve comprising:

a. an adapter having a first bore therethrough;
b. a bushing having a second bore therethrough connected to said adapter, said first and second bores forming a concentric continuous passageway;
c. a closed end tubular sampling stem extending within said continuous passageway spaced from said adapter and said bushing for free movement between an open and closed position, said sampling stem having a fluid inlet port adjacent said closed end;
d. first seal means in contact with said adapter, said bushing and said sampling stem in the open and closed position for sealing said continuous passageway;
e. support means for supporting said sampling stem concentrically within said continuous passageway; and
f. drive means connected to said sampling stem for sliding said sampling stem back and forth within said continuous passageway to position said inlet port on one side of said first seal means in the open position and on an opposite side of said first seal means in the closed position.

2. The invention of claim 1 additionally comprising second seal means in contact with said bushing and said sampling stem for sealing said continuous passageway.

3. The invention of claim 2 in which said support means includes:
a. an annular groove in said second bore; and
b. an annular ring retained in said groove and contacting said sampling stem.

4. The invention of claim 3 wherein said adapter has internal threads on one end and the other end adapted to be connected to a sampling means.

5. The invention of claim 4 wherein said bushing has external threads adjacent opposite first and second ends and said first end is threaded into the threads of said adapter.

6. The invention of claim 5 wherein said sampling stem has a first flange externally extending radially therefrom.

7. The invention of claim 6 wherein said drive means includes:
a. a nut having a third bore therethrough;
b. internal threads on one end of said nut engaging the external threads on the second end of said bushing concentrically aligning said third bore with said first and second bores;
c. a second flange adjacent said internal threads internally extending radially within said third bore;
d. an annular ring in said third bore cooperating with said second flange to define a space for said first flange of said sampling stem; and
e. a retaining ring in said third bore for retaining said annular ring in place whereby said sampling stem is slidably moved back and forth within said continuous passageway as said nut is threaded back and forth on said bushing.

8. The invention of claim 7 additionally comprising indicator means for indicating when said valve is in the open and closed position.

9. A fluid sampling valve comprising:
a. an adapter having a first bore therethrough;
b. a bushing having a second bore therethrough connected to said adapter, said first and second bores forming a concentric continuous passageway;
c. a closed end tubular sampling stem extending within said continuous passageway spaced from said adapter and said bushing for free movement between an open and closed position, said sampling stem having a fluid inlet port adjacent said closed end;
d. first seal means in contact with said adapter, said bushing and said sampling stem in the open and closed position for sealing said continuous passageway;
e. support means for supporting said sampling stem concentrically within said continuous passageway;
f. drive means connected to said sampling stem for sliding said sampling stem back and forth within said continuous passageway to position said inlet port on one side of said first seal means in the open position and on an opposite side of said first seal means in the closed position, said drive means including a nut having a third bore therethrough concentrically aligned with said first and second bores; and
g. indicator means including;
   i. an external flange extending radially on said bushing intermediate its first and second ends;
   ii. a slot in one external side of said nut; and
   iii. a flexible arm on said flange extending toward said nut having an end positioned in said slot when said inlet port is on one side of said first seal means and outside said slot when said inlet port is positioned on an opposite side of said first seal means.

10. The invention of claim 9 in which said first and second seal means are O-rings.

11. The invention of claim 10 in which said annular ring, said bushing, said nut, said external flange, and said arm are plastic material.

12. The invention of claim 11 in which said adapter and said sampling stem are glass.

13. A fluid sampling valve comprising:
a. an adapter having a first bore therethrough;
b. a bushing having a second bore therethrough connected to said adapter, said first and second bores forming a concentric continuous passageway;
c. a closed end tubular sampling stem extending within said continuous passageway spaced from said adapter and said bushing for free movement between an open and closed position, said sampling stem having a tapered closed end and a fluid inlet port adjacent said closed end;
d. first seal means in contact with said adapter, said bushing, and said sampling stem in the closed position for sealing said continuous passageway;
e. second seal means in contact with said bushing and said sampling stem for sealing said continuous passageway;
f. support means for supporting said sampling means concentrically within said continuous passageway;
g. drive means connected to said sampling stem for sliding said sampling stem back and forth within said continuous passageway to position said tapered end in contact with said first seal means in the closed position and out of contact with said first seal means in the open position, said drive means including a nut having a third bore therethrough concentrically aligned with said first and second bores;
h. indicator means including:

i. an external flange extending radially on said bushing intermediate its first and second ends;
ii. a slot in one external side of said nut; and
iii. a flexible arm on said flange extending toward said nut having an end positioned in said slot when said inlet port is on one side of said first seal means and outside said slot when said inlet port is positioned on an opposite side of said first seal means.

* * * * *